US006784365B2

(12) United States Patent
Ohashi et al.

(10) Patent No.: US 6,784,365 B2
(45) Date of Patent: Aug. 31, 2004

(54) CAVITY STRUCTURE OF ELECTRIC JUNCTION BOX

(75) Inventors: Norihiro Ohashi, Haibara-gun (JP); Hiroki Kondo, Haibara-gun (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/448,361

(22) Filed: May 30, 2003

(65) Prior Publication Data

US 2003/0221852 A1 Dec. 4, 2003

(30) Foreign Application Priority Data

May 31, 2002 (JP) .................................... P2002-160010

(51) Int. Cl.[7] ................................................ H02G 3/08

(52) U.S. Cl. ............................ 174/50; 174/58; 174/60; 220/4.02

(58) Field of Search ............................ 174/50, 58, 60; 220/4.02, 3.2; 248/906; 439/535

(56) References Cited

U.S. PATENT DOCUMENTS

| | | | | | |
|---|---|---|---|---|---|
| 5,514,010 | A | | 5/1996 | Myer et al. | |
| 5,621,311 | A | * | 4/1997 | Kamiya | 324/156 |
| 5,920,188 | A | * | 7/1999 | Voorheis et al. | 324/110 |
| 6,350,949 | B1 | * | 2/2002 | Boyd | 174/50.5 |
| 6,462,270 | B1 | * | 10/2002 | Depp et al. | 174/50 |
| 6,570,088 | B1 | * | 5/2003 | Depp et al. | 174/50 |

FOREIGN PATENT DOCUMENTS

| | | | |
|---|---|---|---|
| JP | 11-96890 | A | 4/1999 |
| JP | 11-96891 | A | 4/1999 |
| JP | 2001-325875 | A | 11/2001 |

* cited by examiner

*Primary Examiner*—Dhiru R Patel
(74) *Attorney, Agent, or Firm*—Sughrue Mion, PLLC

(57) ABSTRACT

A first housing is formed with a cavity adapted to receive both of a second housing having a first length and provided with a first fuse, and a third housing having a second length smaller than the first length and provided with a second fuse. The cavity has a bottom. A pair of terminals are extended from the bottom of cavity so as to have a third length. The terminals are adapted to be fitted with both of the first fuse and the second fuse. At least one spacer having a predetermined thickness smaller than the third length is removably disposed on the bottom of cavity, at least in a case where the third housing is received in the cavity.

7 Claims, 6 Drawing Sheets

CAVITY STRUCTURE OF ELECTRIC JUNCTION BOX

BACKGROUND OF THE INVENTION

This invention relates to a cavity structure of an electric junction box in which an automotive fuse is mounted.

FIG. 4 shows a related-art electric junction box in which an automotive fuse is mounted.

In the cavity 40 shown in FIG. 4, a pair of tab (male) terminals 43 and 44, projecting from a bottom plate 42, are disposed within a housing receiving portion 41 having four side walls, and an upper end portion of the housing receiving portion 41 serves as a cavity opening 45. The pair of tab terminals 43 and 44 are connected serially to a circuit of an automotive electrical equipment.

Examples of automotive fuses to be mounted in such a cavity 40 are shown in FIGS. 5 and 6.

An automotive fuse 50, shown in FIG. 5, is a long-body plug-in fuse, and a cover 52 is provided at an upper end of a housing body 51 of a square tubular shape, and an opening 53 is formed at a lower end of the housing body 51. A pair of tab-receiving (female) terminals 54 and 55 are provided within the housing body 51, and are disposed relatively remote from the opening 53, and a fusible element 56 is integrally connected to upper ends of the tab-receiving terminals 54 and 55. The cover 52 is locked to the housing body 51 by a pair of locking pieces (not shown).

An automotive fuse 60, shown in FIG. 6, is a short-body plug-in fuse, and a cover 62 is provided at an upper end of a housing body 61 of a square tubular shape, and an opening 63 is formed at a lower end of the housing body 61. A pair of tab-receiving (female) terminals 64 and 65 are provided within the housing body 61, and are disposed relatively close to the opening 63, and a fusible element 66 is integrally connected to upper ends of the tab-receiving terminals 64 and 65.

A pair of elastic locking pieces 62*a* are formed respectively at opposite ends of the cover 62, and these locking pieces 62*a* can be locked respectively to a pair of retaining projections 61*a* formed respectively at corresponding portions of the housing body 61.

The opening 53, 63 of the automotive fuse 50, 60 is located in registry with the cavity opening 45, and the housing body 51, 61 is inserted into the housing receiving portion 41 until the opening 53, 63 is brought into contact with the bottom plate 42, so that the tab-receiving terminals 54 and 55 (64 and 65) are electrically connected to the tab terminals 43 and 44, respectively.

When a large current flows in the circuit, for example, as a result of development of seizure in the electrical equipment such as a motor, the fusible element 56, 66 melts to break the circuit so as to prevent an excess large current from flowing in the circuit, thus protecting the circuit.

The automotive fuses 50 and 60 are disclosed, for example, in Japanese Patent Publication No. 2001-325875A.

Usually, fuse cavities, together with switching devices (such as relays) are provided at a junction box or a specially-designed fuse box, and therefore it is not desired to form the fuse cavities into various shapes, and the fuse cavities are molded into a standardized single shape. Therefore, it has been desired that the cavity 40 should have the housing receiving portion 41 of a common construction for use with both of the long-body automotive fuse 50 and the short-body automotive fuse 60.

When the long-body automotive fuse 50 is mounted in the cavity 40, the housing body 51 is received within the housing receiving portion 41, with the distal ends of the tab terminals 43 and 44 considerably spaced from the fusible element 56 (see FIG. 5).

However, when the short-body automotive fuse 40 is mounted in the cavity, the housing body 61 is received within the housing receiving portion 41, with the distal ends of the tab terminals 43 and 44 disposed close to the fusible element 66, and therefore the tab terminals 43 and 44 are liable to interfere with the fusible element 66. When the tab terminals 43 and 44 interfered with the fusible element 66, there is anxiety that the housing body 61 could not be surely inserted into the housing receiving portion 41.

When the tab terminals 43 and 44 are designed such that the length of projecting of the tab terminals 43 and 44 within the housing receiving portion 41 is reduced, the above anxiety with the short-body automotive fuse 60 is overcome. However, since the length of projecting of the tab terminals 43 and 44 are short, the area of contact between each of the tab terminals 43 and 44 and the corresponding tab-receiving terminal 64, 65 of the long-body automotive fuse 60 is reduced, the electrical connection between the two would be unstable.

SUMMARY OF THE INVENTION

It is therefore an object of the invention is to provide a cavity structure of an electric junction box which has an enhanced general-purpose ability for use with various fuses.

In order to achieve the above object, according to the invention, there is provided an electric junction box, comprising:

- a first housing, formed with a cavity adapted to receive both of a second housing having a first length and provided with a first fuse, and a third housing having a second length smaller than the first length and provided with a second fuse, the cavity having a bottom;
- a pair of terminals, extending from the bottom of cavity so as to have a third length, and adapted to be fitted with both of the first fuse and the second fuse; and
- at least one spacer, having a predetermined thickness smaller than the third length and removably disposed on the bottom of cavity, at least in a case where the third housing is received in the cavity.

Here, it is preferable that the predetermined thickness is determined so as to adjust a fitting amount of the third housing into the cavity.

It is also preferable that the predetermined thickness is determined so as to adjust a length of the terminals projected from a top face of the spacer.

It is also preferable that the predetermined thickness is determined so as to adjust a depth of the cavity.

In the above configuration, in a case where the terminals interfere with the fuse provided in the mating housing, the spacer is disposed so as to reduce the fitting amount of the mating housing into the cavity (the projected amount of the terminal from the top face of the spacer, or the depth of the cavity). On the other hand, in a case where the terminals do not interfere with the fuse, the spacer is not disposed.

Therefore, the different housings can be surely mounted in the first housing of the same construction, and there can be obtained the electric junction box having an enhanced general-purpose ability for use with the various fuses.

Preferably, an outline of the spacer is substantially identical with an outline of the bottom of the cavity.

It is also preferable that the spacer is formed with a pair of through holes through which the terminals are inserted.

In such configuration, since the terminals are prevented from being bent, the fuse is prevented from being displaced out of position.

Preferably, a color of the spacer is different from a color of the first housing.

In such a configuration, those cavities, each having the spacer mounted therein, can be easily distinguished from those cavities each having no spacer, and the erroneous mounting of the fuse can be surely prevented.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

One preferred embodiment of a cavity structure of an electric junction box of the invention will now be described in detail with reference to the accompanying drawings.

Figure 1:
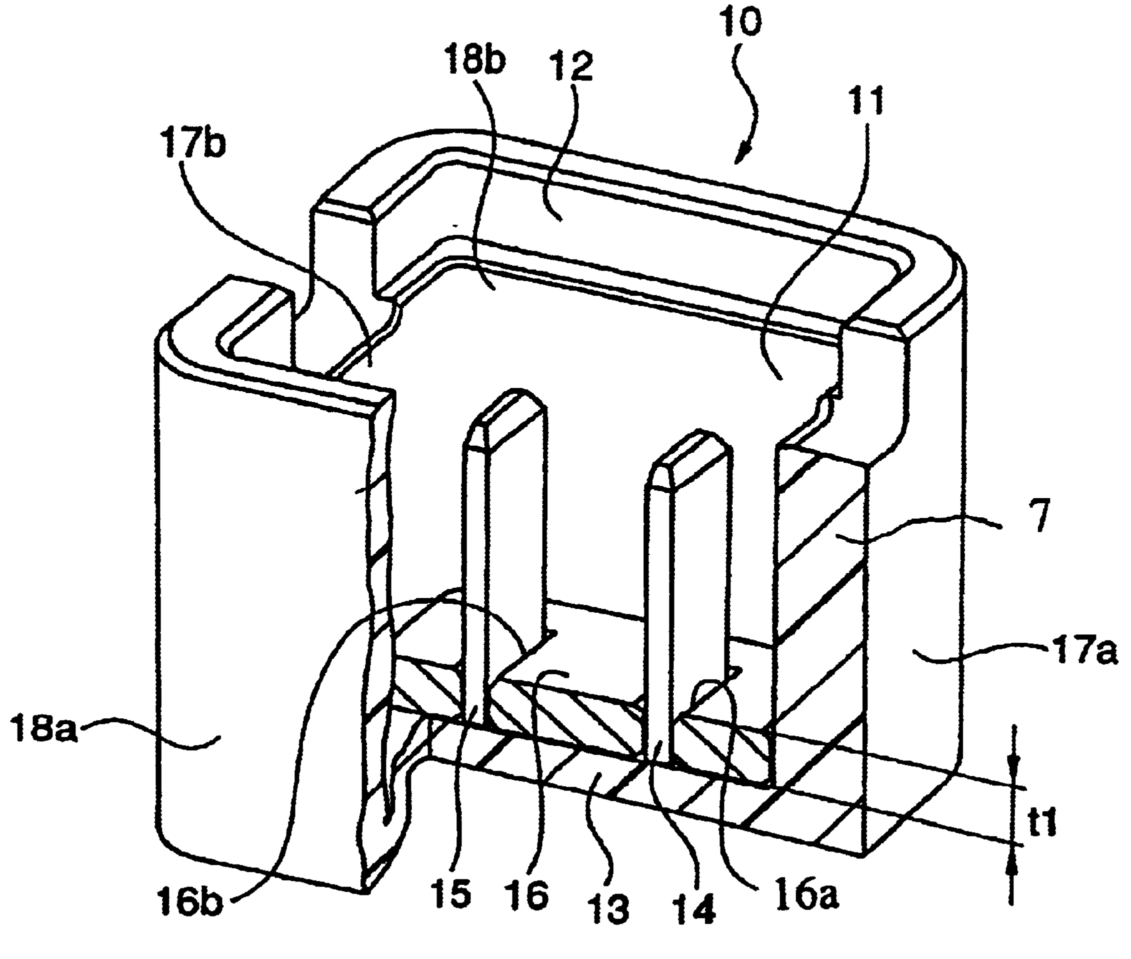
FIG. 1 is a partly-broken perspective view of a cavity structure of an electric junction box according to one embodiment of the invention.
Figure 2:
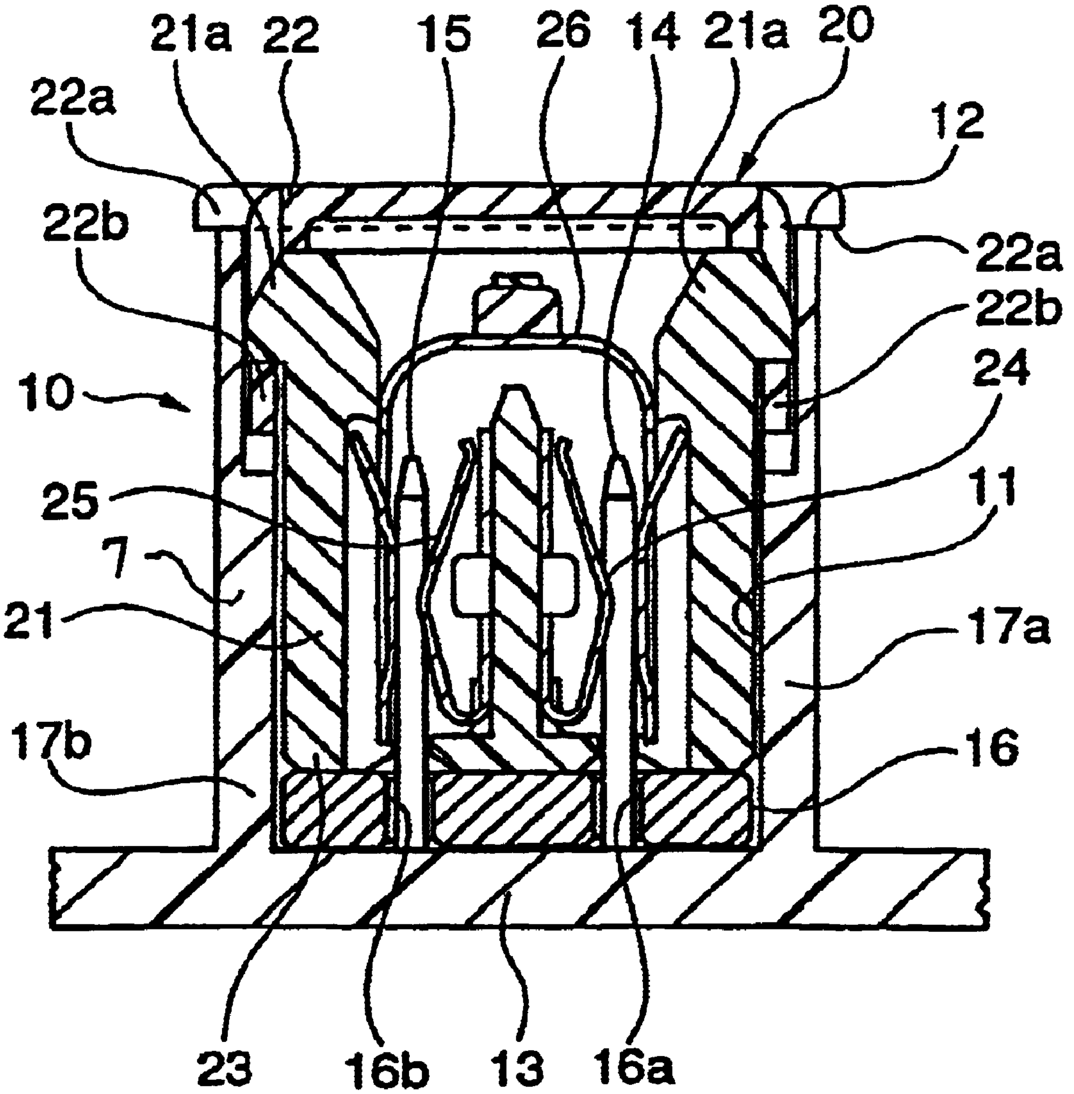
FIG. 2 is a cross-sectional view of the cavity structure in which a short-body automotive fuse is mounted.

As shown in FIGS. 1 and 2, the electrical junction box has a first housing body 7 having a cavity 10 for receiving a second housing body 31 of fuse 30 and a third housing body 21 of fuse 20, as discussed below. The cavity 10 of the electric junction box of this embodiment includes a housing receiving portion 11 having a cavity opening 12, a bottom plate 13, a pair of tab (male) terminals 14 and 15, and a spacer 16. A plurality of cavities 10 are provided on the electric junction box such as a relay box.

The housing receiving portion 11 is defined by inner surfaces of four side plates 17*a*, 17*b*, 18*a* and 18*b*, and an upper end portion of this housing receiving portion serves as the cavity opening 12. The bottom plate 13 is integrally connected to lower ends of the side plates 17*a*, 17*b*, 18*a* and 18*b*.

The pair of tab terminals 14 and 15 are provided generally at a central portion of the bottom plate 13 in a juxtaposed manner, and project toward the cavity opening 12. The tab terminals 14 and 15 extend through the bottom plate 13 at their lower end portions, and are connected serially at their lower ends to an upstream side of a circuit of an electrical equipment mounted on a vehicle body.

The spacer 16 has substantially the same size as that of the bottom plate 13, and has a predetermined thickness t1.

The spacer 16 is made of an insulative material such as rubber or a synthetic resin, and is molded into an integral construction.

A pair of through holes 16*a* and 16*b* for the passage of the pair of tab terminals 14 and 15 are formed through the spacer 16.

The spacer 16 is inserted into the housing receiving portion 11 through the cavity opening 12, and the tab terminals 14 and 15 are passed respectively through the through holes 16*a* and 16*b*, so that this spacer 16 is laid on an upper surface of the bottom plate 13 over an entire area thereof. Thus, the spacer is removably mounted in the cavity 10. By doing so, an adjustment is made to decrease the depth of the housing receiving portion 11, that is, the amount of insertion of the fuse.

When the spacer 16 is not mounted, the depth of the housing receiving portion 11, that is, the amount of insertion of the fuse, does not need to be adjusted. In other words, by mounting the spacer 16, the amount of projecting of the tab terminals 14 and 15 beyond the upper surface of the bottom plate 13 can be adjusted into a smaller value. By not mounting the spacer 16, the amount of projecting of the tab terminals 14 and 15 beyond the upper surface of the bottom plate 13 can be adjusted into a maximum value.

When a short-body automotive fuse 20 is to be mounted in the cavity 10 of this embodiment, the spacer 16 is mounted in the cavity as shown in FIG. 2. In the short-body automotive fuse 20, a cover 22 is provided at an upper end of the housing body 21 of a square tubular shape (the width and height of this housing body are generally equal to each other), and an opening 23 is formed at a lower end of the housing body 21.

A pair of tab-receiving (female) terminals 24 and 25 are provided within the housing body 21, and are disposed relatively close to the opening 23, and a fusible element 26 is integrally connected to upper ends of the tab-receiving terminals 24 and 25.

A stopper 22*a* for abutting against the upper end of the housing receiving portion 11 is formed at and projects from a peripheral edge of the cover 22. A pair of elastic locking pieces 22*b* are formed respectively at opposite ends of the cover 22, and these locking pieces 22*b* can be locked respectively to a pair of retaining projections 21*a* formed respectively at corresponding portions of the housing body 21. This stopper may be formed at the housing body 21 side.

The opening 23 of the automotive fuse 20 is located in registry with the cavity opening 12 of the cavity 10, and the housing body 21 is inserted into the housing receiving portion 11 until the opening 23 is brought into contact with the spacer 16. As a result, the automotive fuse is mounted in the cavity 10 in such a manner that the tab-receiving terminals 24 and 25 are electrically connected to the tab terminals 14 and 15, respectively. At this time, the depth of the housing receiving portion 11 is adjusted into a smaller value by the spacer 16, so that the automotive fuse 20 can be surely mounted while the tab terminals 14 and 15 do not interfere with the fusible element 26.

Figure 3:
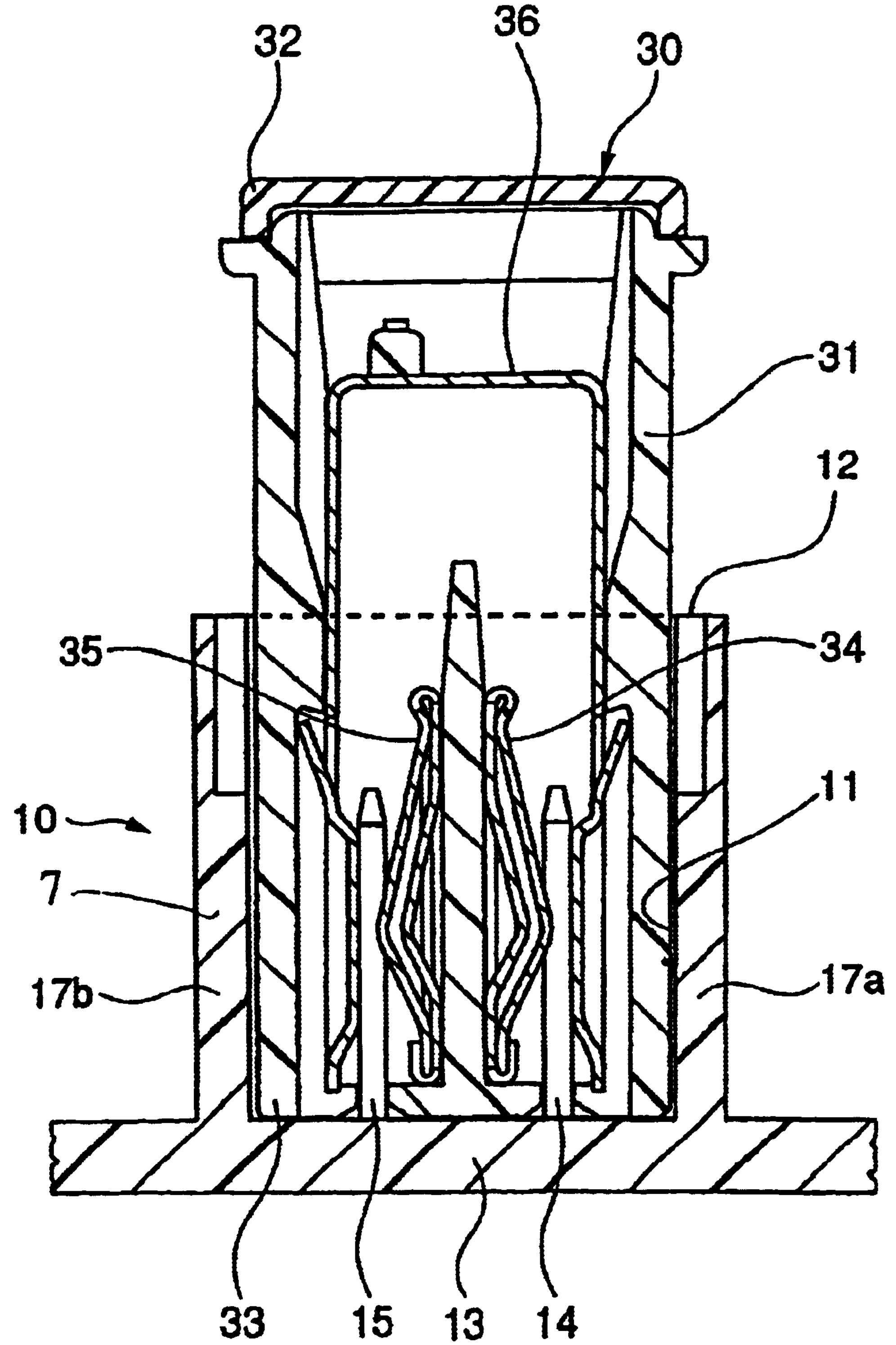
FIG. 3 is a cross-sectional view of the cavity structure in which a long-body automotive fuse is mounted.
Figure 4:
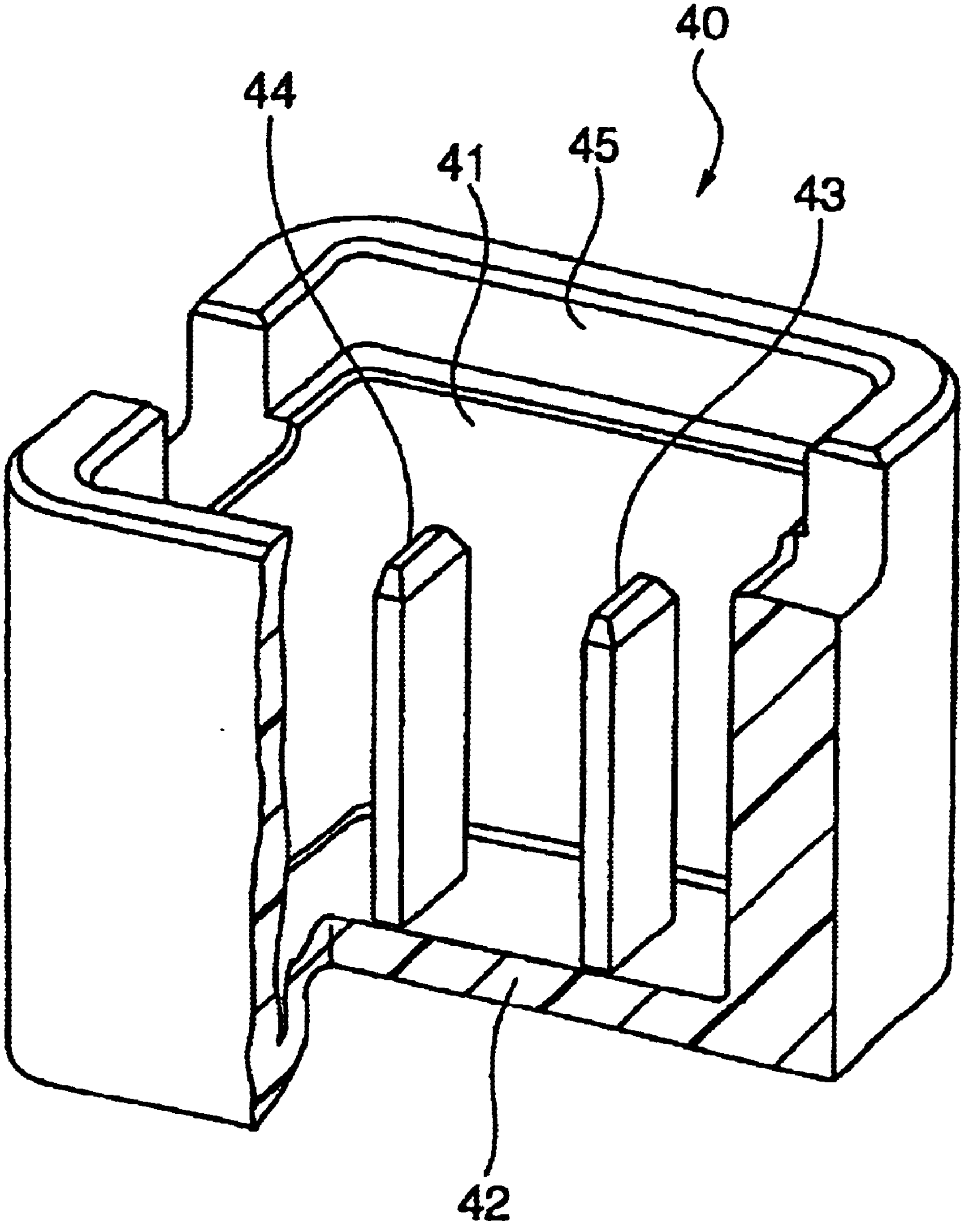
FIG. 4 is a partly-broken perspective view of a related-art cavity structure of an electric junction box.
Figure 5:
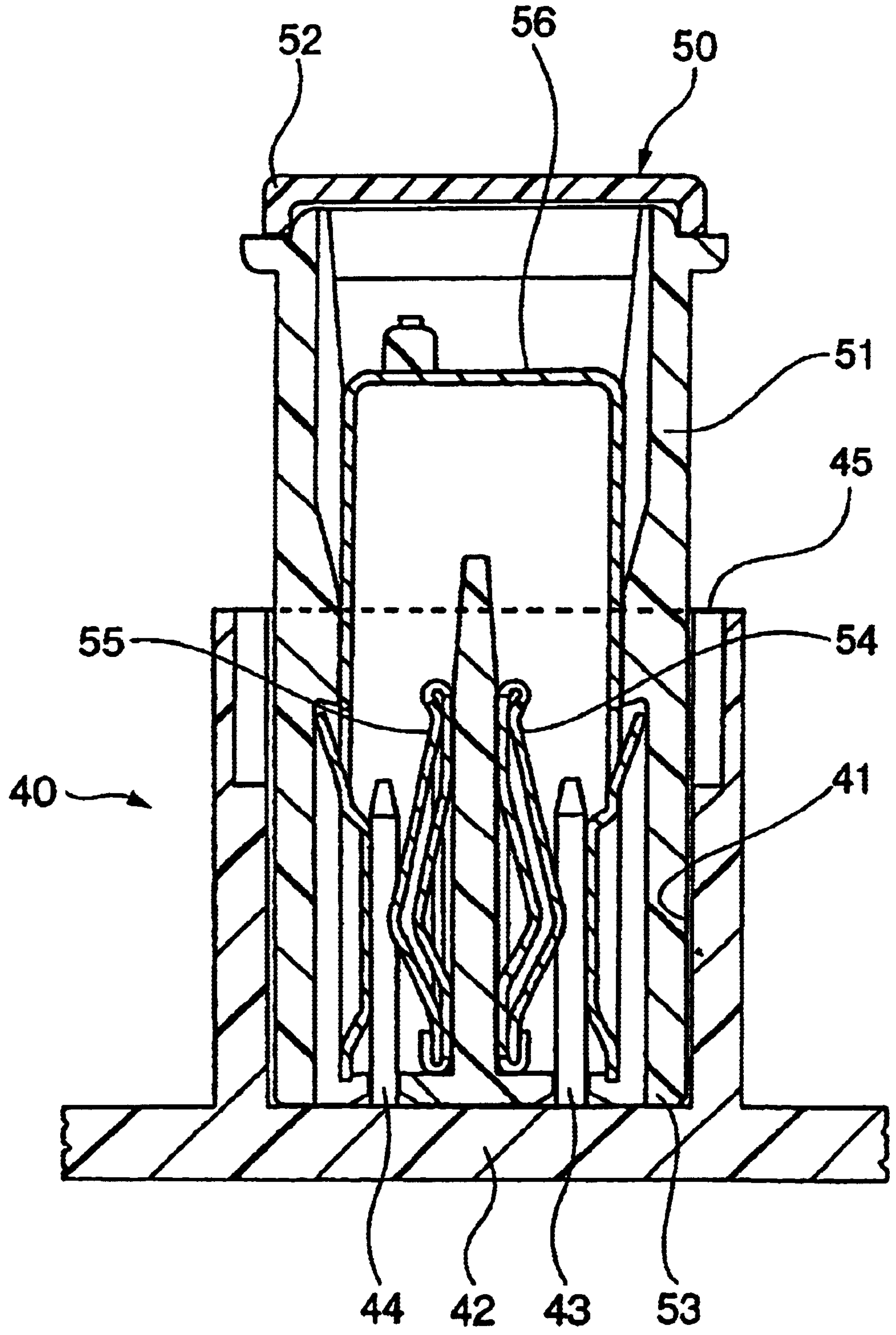
FIG. 5 is a cross-sectional view of the related-art cavity structure in which a long-body automotive fuse is mounted.
Figure 6:
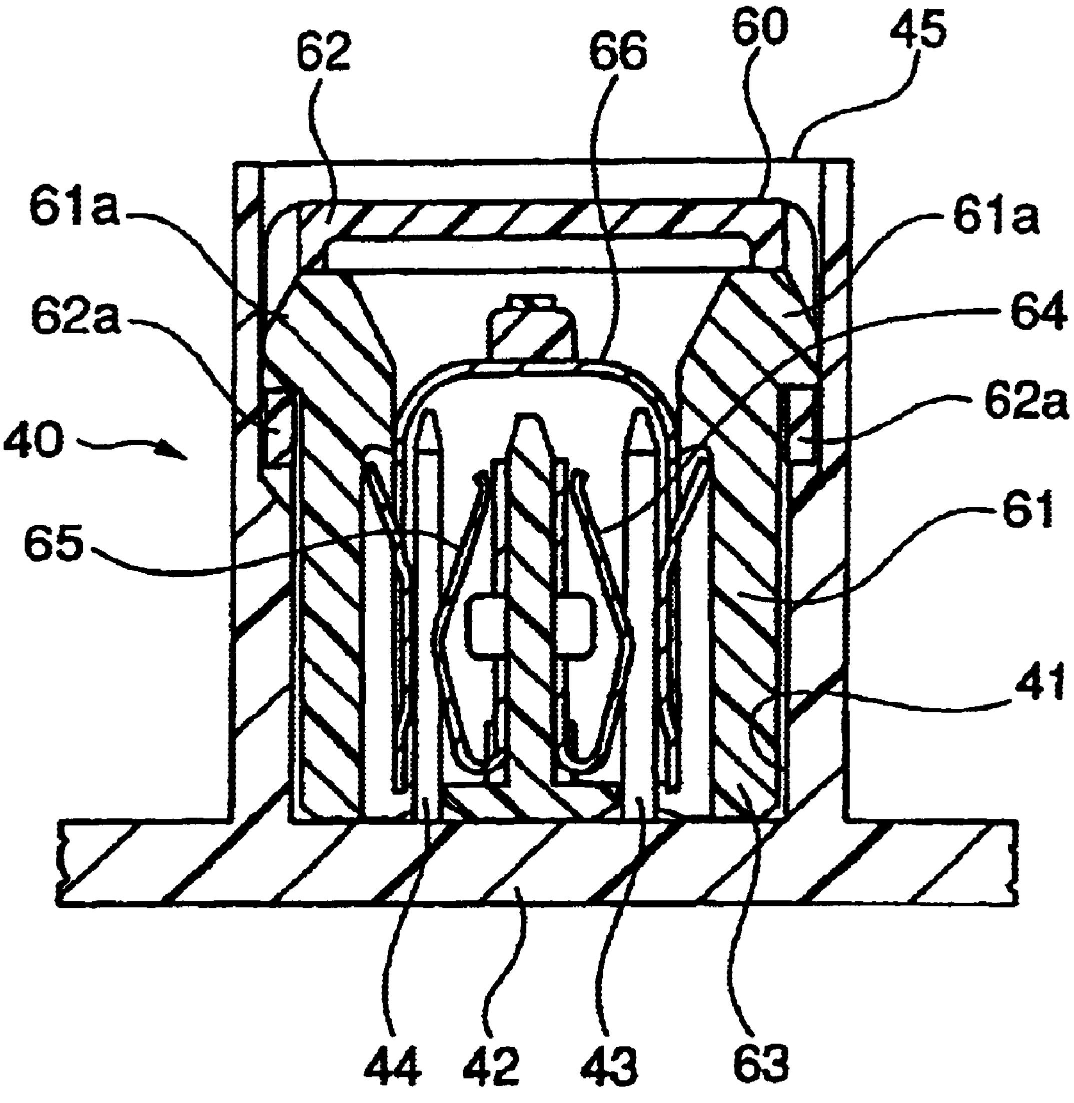
FIG. 6 is a cross-sectional view of the related-art cavity structure in which a short-body automotive fuse is mounted.

For mounting the long-body automotive fuse 30, this long-body automotive fuse 30 is mounted directly in the cavity without the use of the spacer 16 as shown in FIG. 3. In the long-body automotive fuse 30, a cover 32 is provided at an upper end of the housing body 31 of a square tubular shape (the height of this housing body is larger than its width), and an opening 33 is formed at a lower end of the housing body 31.

A pair of tab-receiving (female) terminals 34 and 35 are provided within the housing body 31, and are disposed relatively remote from the opening 33, and a fusible element 36 is integrally connected to upper ends of the tab-receiving terminals 34 and 35. The cover 32 is locked to the housing body 31 by a pair of locking pieces (not shown).

The opening 33 of the automotive fuse 30 is located in registry with the cavity opening 12 of the cavity 10, and the housing body 31 is inserted into the housing receiving portion 11 until the opening 33 is brought into contact with the bottom plate 13. As a result, the automotive fuse is mounted in the cavity 10 in such a manner that the tab-receiving terminals 34 and 35 are electrically connected to the tab terminals 14 and 15, respectively. At this time, the tab terminals 14 and 15 will not interfere with the fusible element 36 since the depth of the housing receiving portion 11 of the cavity 10 is predetermined in accordance with the long-body automotive fuse.

According to the above configuration, it is not necessary to change the overall configuration of the cavity 10, depending on the type of the fuse 20, 30. Only what is to do is forming and mounting the spacer 16 in accordance with the sizes of the automotive fuses.

In addition, since the spacer 16 has the same outer shape as that of the bottom plate 13 of the housing receiving portion 11, the tab terminals 14 and 15 are prevented from being bent, so that the fuse 20, 30 is prevented from being displaced out of position.

Furthermore, since the spacer 16 is mounted in the cavity 10 such that it can be recognized with the eyes, it is possible to avoid erroneous mounting of the fuse in such a way the long-body automotive fuse 30 is mounted in the cavity 10 in which the spacer 16.

In the cavity structure of the electric junction box of the invention is not limited to the above embodiment, and suitable modifications and improvements can be made.

For example, instead of using the spacer having the same outer shape as that of the bottom plate, there may be used a spacer having an elliptical or an oval shape covering the tab terminals.

Preferably, the spacer has a different color from that of the cavity. In this case, those cavities, each having the spacer mounted therein, can be easily distinguished from those cavities each having no spacer, and the erroneous mounting of the fuse can be surely prevented.

The thickness of the spacer is not always limited to the value determined in accordance with the short-body and long-body automotive fuses, but this thickness can be selected in accordance with the structure of other fuses used in the specified vehicle. Also, the disposed number of the spacer may be two or more. Therefore, by preparing several kinds of spacers of different thicknesses or disposing plural spacers, the cavity of the same construction can meet three or more kinds (types) of automotive fuses.

The tab terminals as well as the tab-receiving terminals are not limited to two poles, but can be applied to a multi-pole (four poles or six or more poles) arrangement in which pairs of poles are juxtaposed to each other.

What is claimed is:

1. An electric junction box, comprising:

a first housing, formed with a cavity adapted to receive both of a second housing having a first length and provided with a first fuse, and a third housing having a second length smaller than the first length and provided with a second fuse, the cavity having a bottom;

a pair of terminals, extending from the bottom of cavity so as to have a third length, and adapted to be fitted with both of the first fuse and the second fuse; and at least one spacer, having a predetermined thickness smaller than the third length and removably disposed on the bottom of cavity, at least in a case where the third housing is received in the cavity.

2. The electric junction box as set forth in claim 1, wherein the predetermined thickness is determined so as to adjust a fitting amount of the third housing into the cavity.

3. The electric junction box as set forth in claim 1, wherein the predetermined thickness is determined so as to adjust a length of the terminals projected from a top face of the spacer.

4. The electric junction box as set forth in claim 1, wherein the predetermined thickness is determined so as to adjust a depth of the cavity.

5. The electric junction box as set forth in claim 1, wherein an outline of the spacer is substantially identical with an outline of the bottom of the cavity.

6. The electric junction box as set forth in claim 1, wherein the spacer is formed with a pair of through holes through which the terminals are inserted.

7. The electric junction box as set forth in claim 1, wherein a color of the spacer is different from a color of the first housing.

* * * * *